United States Patent

Hunter

[19]

[11] 4,002,963
[45] Jan. 11, 1977

[54] CONVERTER CIRCUIT AND METHOD HAVING FAST RESPONDING CURRENT BALANCE AND LIMITING

[75] Inventor: Patrick L. Hunter, Columbus, Ohio

[73] Assignee: North Electric Company, Galion, Ohio

[22] Filed: May 29, 1975

[21] Appl. No.: 581,915

[52] U.S. Cl. .............................................. 321/18
[51] Int. Cl.² ...................................... H02M 1/08
[58] Field of Search ............................. 321/11–14, 321/16, 18, 45 R

[56] References Cited

UNITED STATES PATENTS

| 3,366,866 | 2/1968 | King ................... 321/18 X |
| 3,490,028 | 1/1970 | Modiano ............................. 321/2 |
| 3,590,360 | 6/1971 | Puckette ........................... 321/18 |
| 3,657,631 | 4/1972 | Martens et al. ................. 321/18 X |
| 3,859,586 | 1/1975 | Wadlington ........................ 321/18 |
| 3,870,943 | 3/1975 | Weischedel et al. ................. 321/2 |

*Primary Examiner*—William M. Shoop
*Attorney, Agent, or Firm*—Charles M. Hutchins

[57] ABSTRACT

A regulated voltage converter utilizing an improved method of pulse width modulation is disclosed wherein acceptable current balance and limiting in the converter switching elements are speedily achieved within one half cycle of converter operation. Converter output current is monitored, shaped according to a nonlinear transfer function, and integrated to form a voltage signal for comparison with a predetermined reference level. When the integrated signal exceeds the reference level, a control signal is generated to terminate the current pulse in the inverter section of the converter. The inherent balancing and limiting characteristics of this arrangement are easily extended to applications wherein multiple converter stages are paralleled to supply higher power to a common load.

7 Claims, 8 Drawing Figures

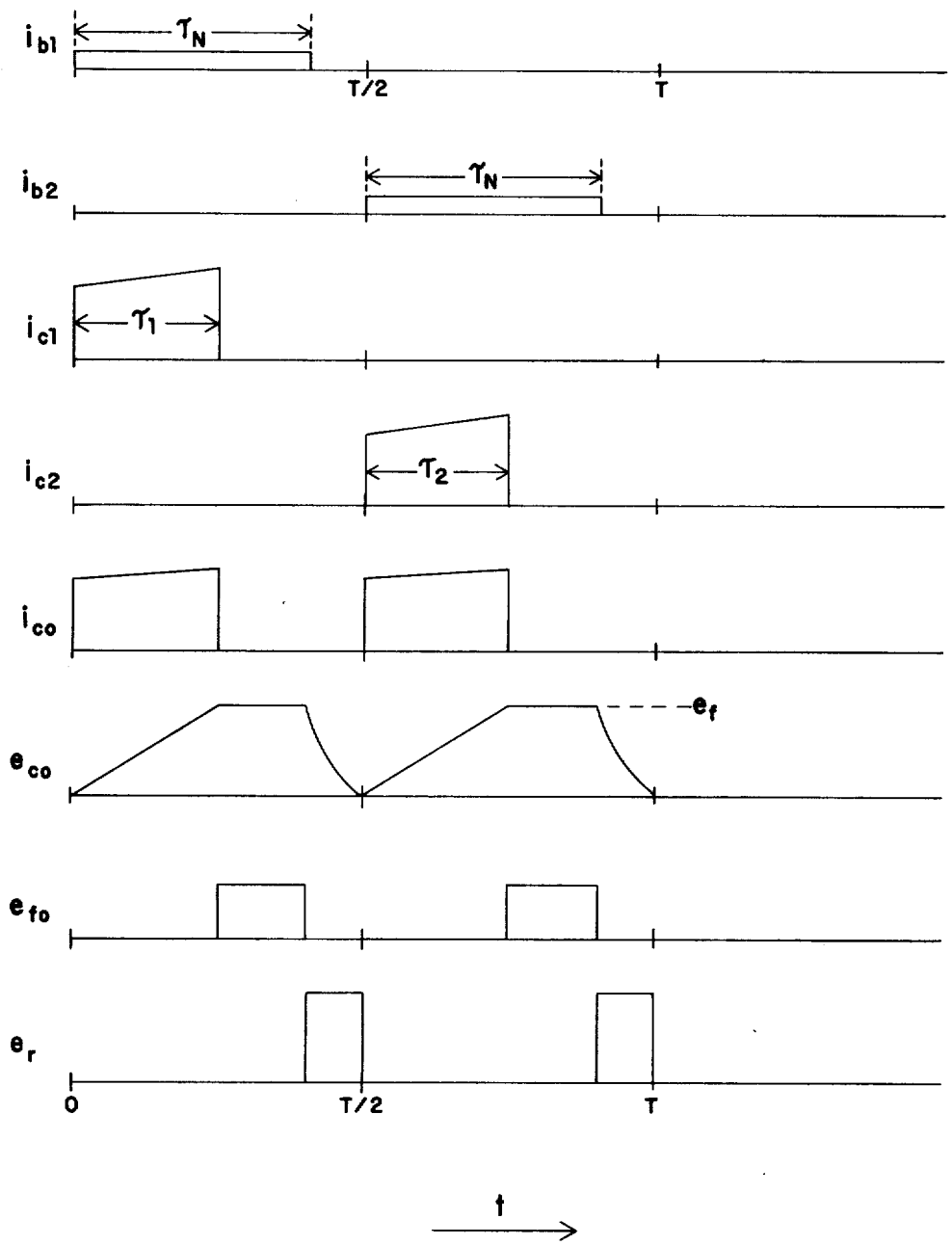

CONVERTER CIRCUIT AND METHOD HAVING FAST RESPONDING CURRENT BALANCE AND LIMITING

BACKGROUND OF THE INVENTION

1. Field of the Invention

This invention relates generally to DC to DC and DC to AC power converters and, more particularly, to those converters employing regulation through use of pulse width modulation to the current pulses of the inverter sections of such converters.

2. Description of the Prior Art

In DC/AC and DC/DC converters, a common prior art problem is that of providing a fast responding current limit function which protects the converter components, particularly semiconductor devices, from the effects of static and transient overloads at the converter output terminals. A second problem, frequently encountered in the prior art is that of maintaining static and transient current balance between the alternately switched devices which convert the DC input to an alternating power waveform. Such switching devices are the major components of what is commonly referred to as the inverter stage of the converter. A third problem in the prior art is one encountered when multiple power converter stages are connected in parallel to supply higher power to a common load. For this case, the current balance among converter stages has not been easy to maintain without the use of complex and slow responding balance circuits.

In converters utilizing transistors as the switching means in their inverter stages, the above problems can cause catastrophic failures in devices, or result in reduced long term converter operating reliability.

Many typical prior art converters operate on the principle of sampling the current at the converter output, rectifying and filtering the current sample, and comparing the resultant signal with a DC reference level. The resultant error signal is amplified and used to control the pulse width of the inverter switching transistor base drive. These techniques are well known, and variations of the approach are found, for example, in U.S. Pat. Nos. such as 3,297,936 — Ruch, 3,660,749 — Kadri, and 3,701,937 — Combs.

Generally, in order to maintain dynamic feedback stability in the current limit modes of such prior art devices, the response time of the feedback error amplifier must be slowed down, or the filters in the feedback path must be designed with low cut-off frequencies. The resultant delays in the feedback path provide slow responding current limit action. Additionally, such prior art circuits do nothing to maintain current balance between the collector currents of the inverter switching devices.

It is well known that in converters utilizing power switching transistors for alternately driving a transformer, very small differences in delays and switching times in the pulse width control circuitry or in the switching characteristics of the inverter switching devices can produce significant differences in the peak collector currents of the inverter switching transistors. Such an imbalance in peak collector current has two effects. First, the stresses on the switching elements become unbalanced. Second, the differential current results in a net DC magnetization of the converter's output transformer core which, in turn, can cause core saturation. Such core saturation, in turn, can lead to the highly unstable condition of still more imbalance in collector current.

Some prior art approaches, such as found in U.S. Pat. No. 3,870,943 — Weischedel, have attacked the problem of current balance but still exhibit relatively slow speed and complex pulse width control circuitry.

Another approach to the current balance problem involves buying of matched pairs of power switching devices. Such an approach is usually unattractive due to the higher cost, stocking problems, and field replacement problems involved. Additionally, even with matched inverter switching devices, the problem of imbalances in their base drive control circuits could still exist.

SUMMARY OF THE INVENTION

Objects

One object for this invention is to provide a converter having means for automatically correcting for inverter transistor collector current imbalance with fast response time - typically less than one half cycle time of converter operation.

A second object of this invention is to provide a converter having means which furnishes fast responding converter output current limit action, typically in less than one half cycle of converter operation.

Further, still another object of the invention is the provision of a converter, meeting the objectives listed hereinabove, which is relatively simple, low in cost, and reliable.

A still further object of this invention is to provide a method for achieving such speedy current balance and limiting characteristics in a voltage converter.

SUMMARY DESCRIPTION

A regulated voltage converter utilizing an improved method of pulse width modulation is disclosed. Current pulses from the inverter stage of the converter are proportionately coupled via a current transformer to a feedback control circuit. The proportionately coupled current is rectified and processed by a waveshaping circuit which provides a nonlinear, monotonically increasing transfer function. The resultant feedback current at the output of the waveshaping circuit is then integrated once every inverter half cycle to produce a feedback voltage which is compared to a DC reference level. When the generated feedback voltage exceeds the reference level, a signal is generated to terminate the current pulse present in the inverter stage. The feedback process thus provides speedy pulse width modulation converter control with inherent current limiting capability.

According to one feature of this invention, a converter is provided which can tolerate a wide variation in switching times among circuit components, particularly in the switching characteristics of the inverter stage power switching devices.

According to another feature of this invention, the converter operates in such a way as to prevent core saturation of the converter's output power transformer.

According to yet another feature of this invention, a converter is provided which may be easily paralleled with other converters of the same design wherein the parallel configuration exhibits fast responding current balance among the different converter stages.

BRIEF DESCRIPTION OF THE DRAWINGS

These and other objects and features of the invention will be apparent from a reading of the following description of an illustrative embodiment taken in conjunction with the drawings in which:

FIG. 2 is a timing diagram showing the relationship among current and voltage signals at key locations in the converter of FIG. 1;

DETAILED DESCRIPTION

As is well known in the art, most basic DC/DC and DC/AC converters include an inverter stage for producing an alternating waveform from a DC input voltage, a pulser circuit for suitably driving the inverter, and an output transformer coupling the inverter current to a load. If, for example, the specific application calls for DC to DC voltage conversion, a rectifier arrangement could be provided as a part of the load circuit.

Figure 1:
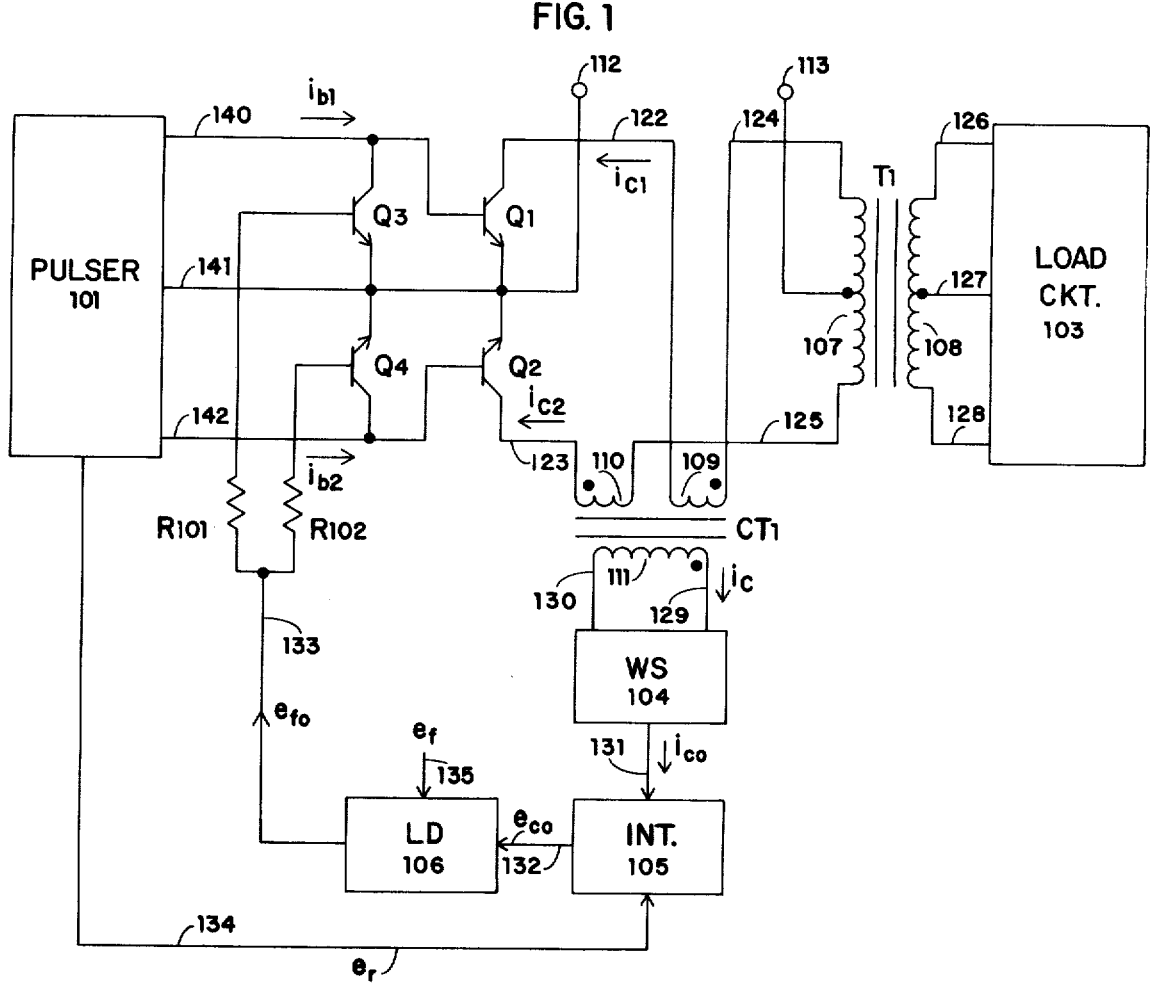
FIG. 1 is a functional diagram of a DC to DC converter constructed in accordance with the principles of the invention.

The converter of FIG. 1 includes the above standard components. The DC source to be converted has its positive polarity connected to terminal 113 and its negative polarity connected to terminal 112. Pulser 101 alternately drives inverter power switching transistors Q1 and Q2 via base drive leads 140 and 142, respectively.

During a half cycle of operation when Q1 is conducting, inverter current flows from terminal 113 to a center tap on output power transformer T1 primary winding 107, through the upper portion of winding 107, over path 124, through primary winding 109 of current transformer, CT1, over path 122 to the collector of Q1, out the emitter of Q1 to terminal 112. During an alternate half cycle of operation when Q2 is conducting, inverter current flows from terminal 113 to the center tap on winding 107, through the lower half of winding 107, over lead 125, through CT1 primary winding 110, over lead 123 to the collector of Q2, and out the emitter of Q2 to terminal 112. The secondary winding 108 of output transformer T1 is shown with end points connected to load circuit 103 via leads 126 and 128, while a center tap of winding 108 is connected, when required, via lead 127 also to load circuit 103.

Secondary winding 111 of CT1 is connected via leads 129 and 130 to waveshaping (WS) circuit 104. WS 104 is, in turn, connected over path 131 to integrator (INT) 105. The output of INT 105 is connected over path 132 to level detector (LD) 106. The output of LD 106 is connected to the junction point of resistors R101 and R102 via path 133. Resistor R101 is, in turn, connected to the base lead of transistor Q3, whose collector lead is tied to the base led of transistor Q1 and whose emitter lead is tied to lead 141. Resistor R102 is, in turn, connected to the base lead of transistor Q4, whose collector lead is tied to the base lead of transistor Q1 and whose emitter lead is tied to lead 141.

Pulser 101 is also connected to integrator 105 via path 134. A DC reference potential, $e_f$, is presented to level detector 106 over path 135. More detailed descriptions of pulser 101, load 103, wave shaper 104, integrator 105, and level detector 106 are set out in later sections of this description.

The general operation of the current balance and limiting features of the instant invention is most clearly set out in conjunction with the circuit diagram of FIG. 1 and with the associated waveform information of FIG. 2.

The inverter current components to be balanced and/or limited are shown in FIG. 1 as in $i_{c1}$, flowing along path 122 in the Q1 collector circuit, and $i_{c2}$, flowing along path 123 in the Q2 collector circuit. $i_{c1}$ and $i_{c2}$ are sensed and proportionately reflected into the converter feedback control loop via current transformer CT1. CT1 should have a substantially narrow hysteresis characteristic with high residual flux density so that the energy stored in the magnetic field when Q1 or Q2 is turned off is small compared to the energy dissipated per converter half cycle by the current transformer's load.

The current reflected into the secondary winding 111 of CT1 is shown in FIG. 1 as $i_c$. $i_c$, which is proportional to $i_{c1}$ and $i_{c2}$, is rectified and operated on by the circuit of WS 104, which provides nonlinear, monotonically increasing transfer function. The output of WS 104 is a current labeled $i_{co}$ and is shown flowing along path 131 of FIG. 1. $i_{co}$ is integrated by INT 105 resulting in a voltage $e_{co}$ shown at path 132 of FIG. 1. The integrated signal, $e_{co}$, is compared with a control voltage level $e_f$, by level detector LD 106.

When $e_{co}$ exceeds $e_f$, a signal $e_{fo}$ on path 133 of FIG. 1 is generated which provides current drive through resistors R101 and R102 sufficient to saturate transistors Q3 and Q4. When Q3 and Q4 saturate, the base drive currents $i_{b1}$, supplied from pulser 101 via lead 140, or $i_{b2}$, supplied from pulser 101 via lead 142, are shunted away from the respective bases of power switching transistors Q1 and Q2, thus removing base drive and turning off the corresponding power transistor switch.

Typical time-related waveforms are shown in FIG. 2. The maximum conduction time for inverter transistors Q1 and Q2 is $\tau_N$ and is determined by pulser 101. Hence the base current outputs of pulser 101, $i_{b1}$ and $i_{b2}$, are shown with pulse widths $\tau_N$. Also shown in FIG. 2 are Q1 collector current $i_{c1}$, with pulse width $\tau_1$, and Q2 collector current $i_{c2}$, with pulse width $\tau_2$. Collector currents $i_{c1}$ and $i_{c2}$ are initiated by respective base currents $i_{b1}$ and $i_{b2}$. However, $i_{c1}$ and $i_{c2}$ are terminated according to pulse width control signal, $e_{fo}$. Feedback control current, $i_{co}$, which is a function of both $i_{c1}$ and $i_{c2}$, is the output of WS 104 and the input of INT 105.

The output of INT 105 is shown in FIG. 2 as $e_{co}$. Note that when $e_{co}$ reaches level $e_f$, control signal $e_{fo}$ is generated. Also note from FIG. 1 and FIG. 2 that INT 105 is reset once each half cycle over path 134 by pulser 101 with voltage $e_r$. $e_r$ is generated whenever pulser 101 outputs $i_{b1}$ and $i_{b2}$ are both near zero.

Figure 3:
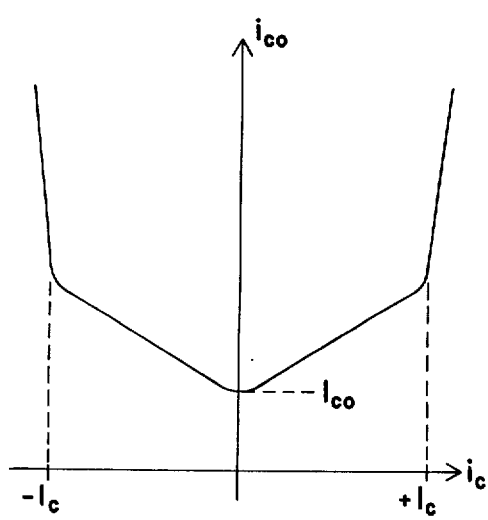
FIG. 3 sets out the general shape of the transfer function characteristic provided by the waveshaping circuit of the converter's feedback control path.

The transfer function effected by WS 104 is shown in FIG. 3. It is desirable to provide a minimum current, $I_{co}$, when $i_c = 0$. This permits an improved degree of control as the inverter current, proportionately represented by $i_c$, approaches zero. As seen in FIG. 3, the output of WS 104, $i_{co}$, will exhibit a low rate of change for all values of input current less than $I_c$ and a high rate of change for all values of input current greater than $I_c$. "Low rate", as used herein, refers to the slope as shown in FIG. 3 for inputs less than $I_c$. "High rate", as used herein, refers to a slope substantially greater than the low rate, also as shown in FIG. 3.

Figure 4:
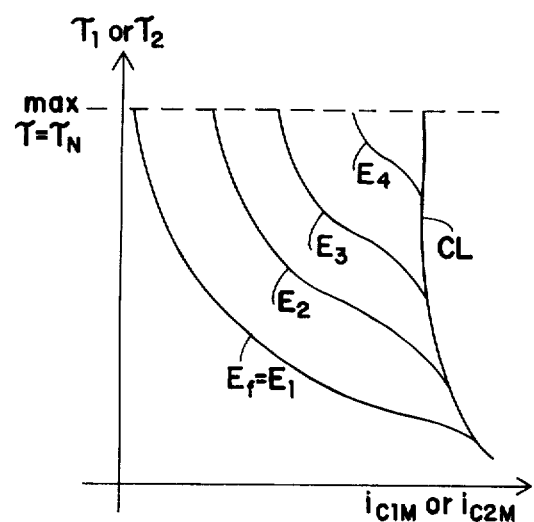
FIG. 4 depicts the functional relationship of the conduction times, $\tau_1$ and $\tau_2$ of the inverter switching devices for various values of DC reference level, $e_f$, when the transfer characteristic of FIG. 3 is employed in the feedback loop of the converter.

For a constant value of the reference level, $e_f$, the conduction time for transistors Q1 and Q2 are inversely proportional to the respective peak collector currents of Q1 and Q2. FIG. illustrates the general functional relationships for various values of $e_f$. $\tau_1$ and $\tau_2$ are the conduction times of Q1 and Q2, respectively. $i_{c1m}$ and $i_{c2m}$ are the collector current magnitudes for Q1 and Q2, respectively. By introducing a non-linearity as described for the transfer characteristic of FIG 3, a current limiting characteristic having a fast rate of fall of inverter switching device conduction time, $\tau$, is realized. Such a current limiting characteristic is represented by curve CL of FIG. 4.

Figure 5:
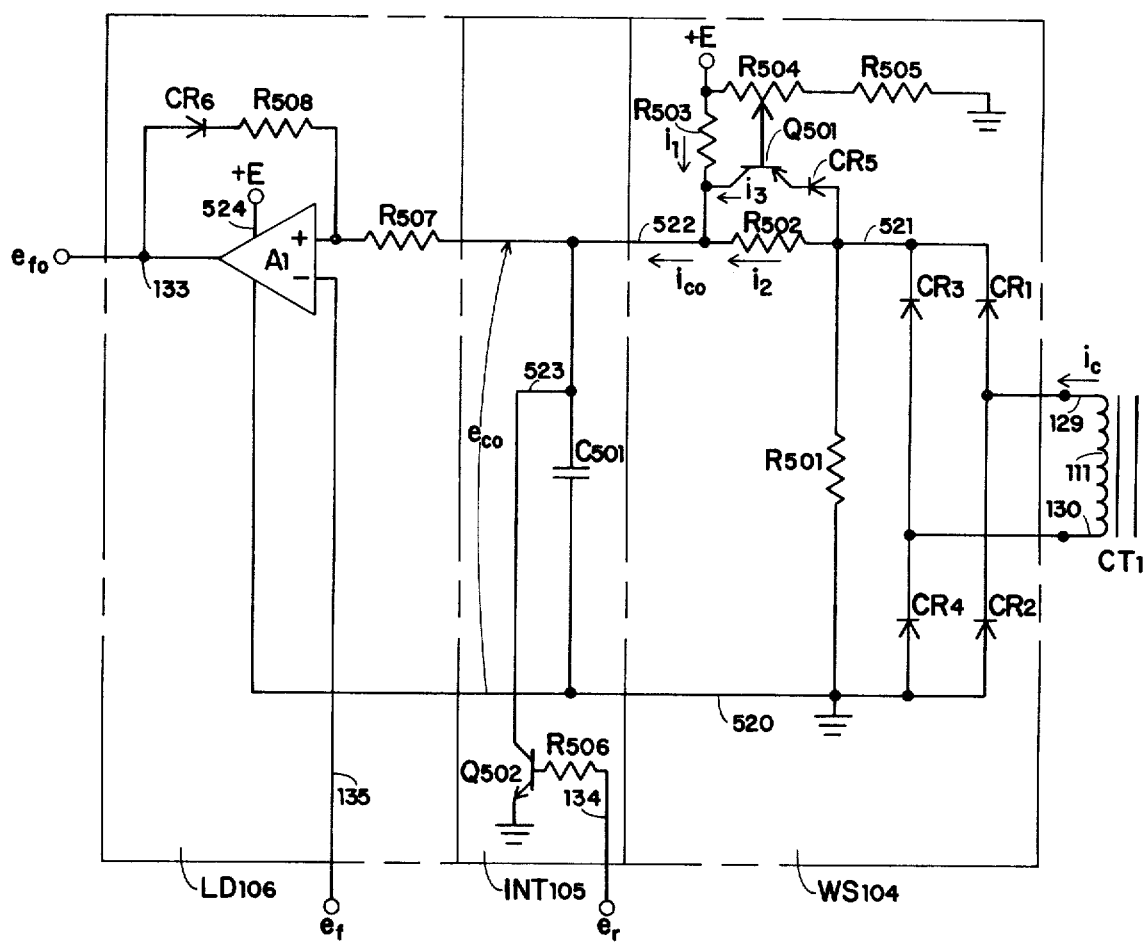
FIG. 5 depicts in more detail the waveshaping circuit, the level detector, and the integrator of FIG. 1, all suitable for use in accordance with the principles of the invention.

WS 104, INT 105, and LD 106 could, for the sake of example, taken the form of the circuitry set forth in FIG. 5. As shown in FIG. 5, secondary winding 111 of current transformer CT1 is connected via leads 129 and 130 to a full wave rectifier comprising diodes CR1, CR2, CR3, and CR4, which presents its output to resistor 501 connected between lead 521 and ground potential at lead 520.

The remainder of WS 104 comprises a current control circuit centered around transistor Q501. The current source also includes diode CR5 in the emitter circuit of Q501, resistor R502 connected between lead 521 and the collector of Q501, and resistor R503 connected between the collector of Q501 and bias supply +E. The current source further includes potentiometer R504 having one end terminal connected to +E, a wiper terminal connected to the base lead Q501, and another end terminal connected to resistor R505 which, in turn, is connected to ground potential.

The integrator INT 105 comprises capacitor C501 connected between lead 522 and ground potential. Transistor Q502 has a collector lead connected to one side of capacitor C501 via lead 523, an emitter lead connected to ground potential, and a base lead connected to lead 134 via resistor R506. Lead 134 carries signal $e_r$ from pulser 101, as previously mentioned in conjunction with FIG. 1.

Level detector LD 106 has an input from INT 105 via resistor R507 which is, in turn, connected to the non-inverting input of high gain amplifier A1. The inverting input of A1 is connected to reference level $e_f$ via lead 135. Bias battery and ground are furnished to A1 via leads 524 and 520, respectively. A positive feedback path comprising the series connection of diode CR6 and resistor R508 connects amplifier output 133 to the amplifier's non-inverting input.

The exemplary embodiments for WF 104, INT 105, and LD 106 are characterized by the following method of operation. A voltage developed across R501 is proportional to the rectified value of $i_c$, derived from current transformer CT1. This voltage across R501 supplies current $i_2$ through R502. The current $i_2$ is utilized for providing balance control over the entire converter load range. The current $i_1$, shown flowing through R503 is relatively independent of $i_c$, provided that the bias supply +E is made large with respect to the integrator's output voltage $e_{co}$. Hence $i_1$ provides the minimum current, $I_{co}$, shown in the transfer characteristic of FIG. 3. The nonlinear portion of this transfer function is supplied by a nonlinear current source, $i_3$, shown in FIG. 5 as flowing from the collector of Q501. $i_3$ is zero for low values of $i_c$. When the magnitude of $i_c$ exceeds a preset value determined by a reference level established by R504 and R505, incremental current starts to flow through CR5 and the collector to emitter terminals of Q501. Hence $i_{co}$, the output of WS104, increases very rapidly as $i_c$ increases above a reference level, as shown previously in conjunction with FIG. 3.

The integrator, INT 105, comprises a capacitor, C501. The conductive pulse widths, $\tau_1$ and $\tau_2$ of inverter transistors Q1 and Q2 of FIG. 1, are determined by the charging current, $i_{co}$, and the time required for the integrated voltage, $e_{co}$, to reach the value $e_f$. Since $i_{co}$ responds almost instantly to changes in $i_c$ (which, in turn, reflects changes in $i_{c1}$ or $i_{c2}$ of FIG. 1), the pulse widths $\tau_1$ and $\tau_2$ are automatically adjusted each inverter half cycle to satisfy a constant value for the ampere-time integral of $i_{co}$.

At the end of each inverter half cycle, transistor Q502 is driven into conduction by a positive voltage signal, $e_r$, at lead 134, thereby placing ground potential across capacitor C501 to reset the integrator output voltage to zero.

The output of LD 106, $e_{fo}$, goes high when $e_{co}$ exceeds the reference level of $e_f$. As $e_f$ is made more positive, the pulse width, $\tau_1$ or $\tau_2$, becomes larger.

Suppose, for example, there is a condition in the circuit of FIG. 1 which causes transistor current $i_{c1}$ to increase and $i_{c2}$ to decrease. Such an imbalance could possibly be caused by a difference in power switching transistor storage times, where Q1 would exhibit a storage time greater than that of Q2. Under such a condition, integrator C501 will charge at a faster rate when Q1 is conducting than when Q2 is conducting. Therefore $\tau_1$ will decrease and $\tau_2$ will increase. The resultant differential change in conduction times is in a direction to correct for the imbalance. Since very little time difference is required to cause relatively large differences in inverter transistor collector current, the collector currents $i_{c1}$ and $i_{c2}$ are easily pulled into balance. There are virtually no time delays in the sensing of inverter current. The only time lag is in integrating $i_{co}$ to the reference level $e_f$ via capacitor C501.

The DC control reference $e_f$, shown in FIG. 1 and FIG. 5, can be utilized as a feedback input to regulate and hold the converter output voltage substantially constant. Load circuit 103 of FIG. 1 could, for example, take the wellknown form set out of FIG. 6. Load 605 is fed by converter output transformer T1 through a full wave rectifier comprising diodes 601 and 602, and thence via a suitable filter comprised of series inductor 603 and parallel capacitor 604. The converter output voltage is also connected via path 610 to the inverting input of amplifier A2 for comparison with a DC reference connected to the non-inverting output of A2 via path 611. The error signal, $e_f$, is the amplified output at path 135. Hence if the converter output voltage increases, the voltage of $e_f$ decreases in magnitude thus reducing the inverter conduction pulse width.

To complete the detailed description of the converter of FIG. 1, an example implementation of pulser 101 is set forth hereinbelow in conjunction with FIg. 7 and FIG. 8.

Figure 7:
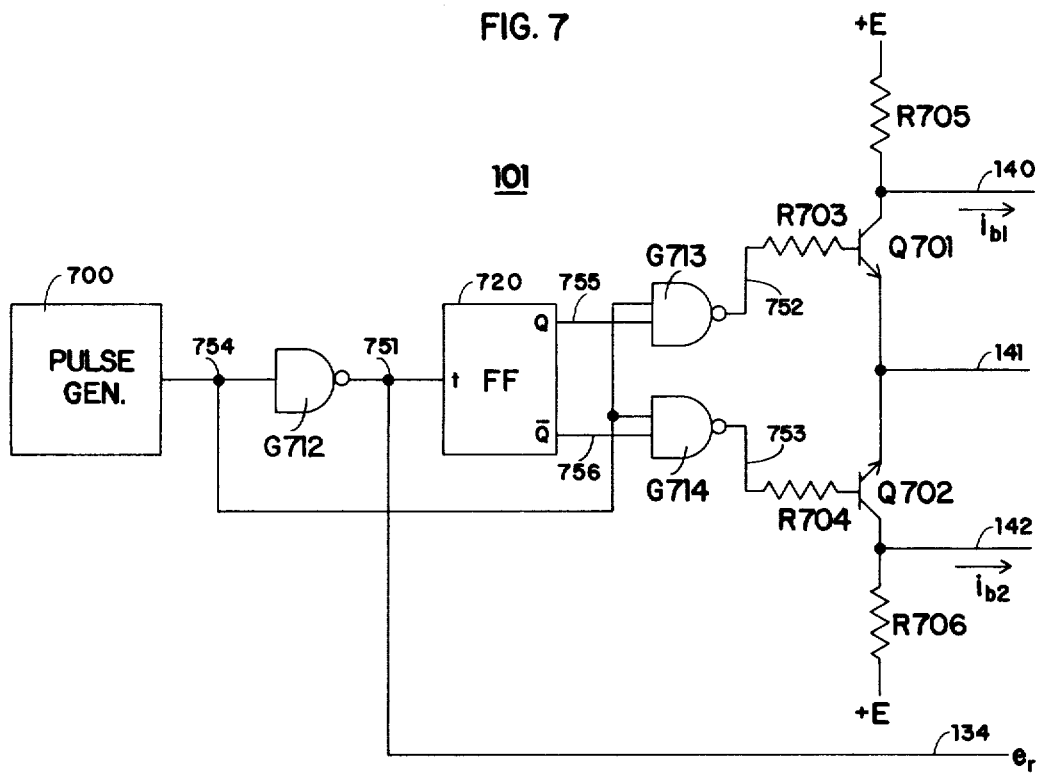
FIG. 7 depicts in more detail an example of the base drive pulser of FIG. 1 suitable for use in accordance with the principles of the invention.

As shown in FIG. 7, pulser 101 is comprised of a substantially rectangular wave pulse generator 700 with output 754 connected to an input of inverter G712 and to an input to each of gates G713 and G714, which are two-input NAND gates. Pulse generator 700 could, for example, comprise a simple astable multivibrator with timing elements suitable for producing the waveform shown as 754 in FIG. 8 wherein there is shown an output that is high for a period of $\tau_x$ and low for a period $\tau_o$.

The output of inverter G712 is connected via path 751 to the toggle input, $t$, to toggle flip-flop 720 and to lead 134 which presents signal $e_r$ to INT 105 of FIG. 1. The other inputs to gates G713 and G714 are connected to the complementary outputs, Q and $\overline{Q}$, of flip-flop 720 via paths 755 and 756, respectively. Output 752 of G713 is connected to the base lead of transistor Q701 via resistor R703, while output via resistor R704. Positive bias supply, E, is connected to the collector lead of Q701 via R705 and to the collector lead of Q702 via resistor R706. Pulser outputs 140, 141, and 142 connect to the inverter stage as shown in FIG. 1.

Figure 8:
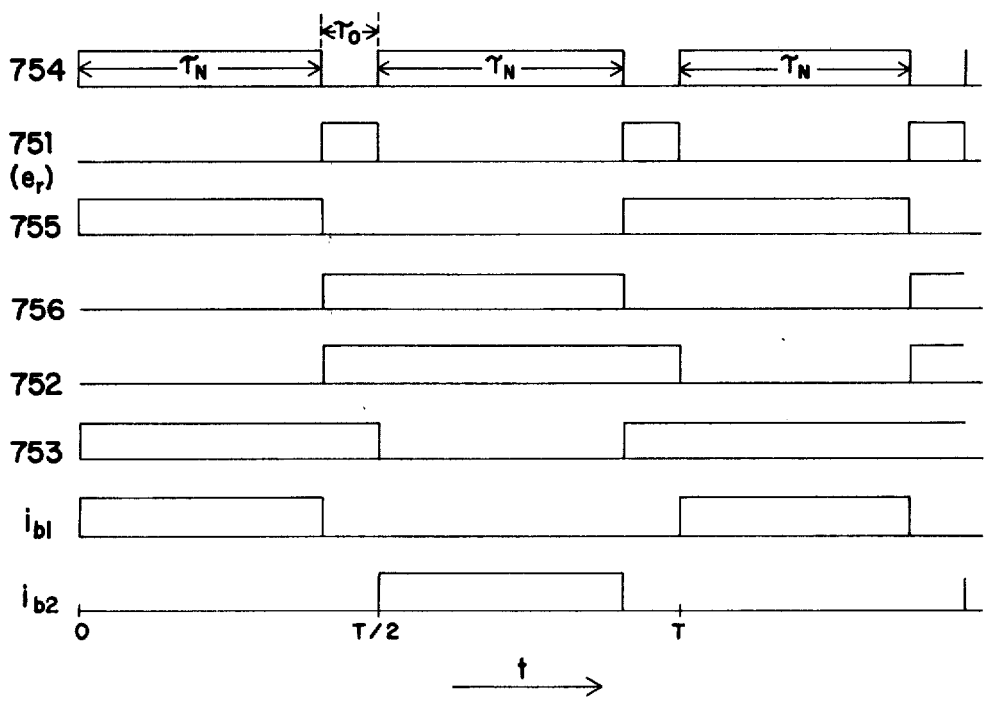
FIG. 8 sets out a timing diagram showing the relationships among signals at key locations in the pulser of FIG. 7.

With the pulse generator output 754 as shown in FIG. 8, the pertinent time-related pulser signals shown also in FIG. 8 result in the final current outputs $i_{b1}$ and $i_{b2}$, and the voltage output $e_r$. $i_{b2}$, and $e_r$ are also shown in the converter timing diagram of FIG. 2. Outputs of pertinent leads in FIG. 7 have labels identical to those for the corresponding waveforms of FIG. 8. In the absence of any pulse width modulation, the basic inverter stage current pulse width will be $\tau_x$, with a dead time between alternate pulses of $\tau_o$.

Figure 6:
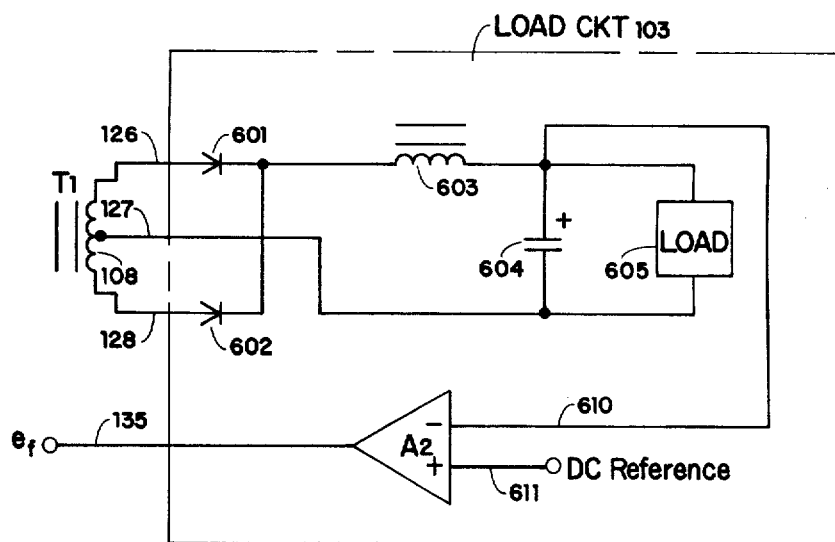
FIG. 6 depicts in more detail the load circuit of FIG. 1 suitable for use in accordance with the principles of the invention.

For heavy overloads at the output of the converter, the rate at which the inverter current, $i_{c1}$ or $i_{c2}$, increases is determined by the output filter inductor, such as inductor 603 of FIG. 6. Normally a few inverter cycles would be required at constant pulse width for collector current to build up to excessive values. Since the pulse width of the converter of the instant invention is automatically adjusted within a single inverter halfcycle, the converter as shown in FIG. 1 is operable to quickly limit overload current stress to negligible values.

It will be appreciated by those skilled in the art that converters of a structure described hereinabove possess properties which lend themselves to applications requiring the paralleling of multiple converter stages for achieving higher power output ratings. The current balance and limiting features inherent to the instant invention, designed to force balance inverter switching transistors, will also force the outputs of two or more such converter stages to balance. Indeed, the output regulating characteristics of such a parallel combination of converters will look identical to those shown for a single converter stage as presented in FIG. 3 and FIG. 4.

It should be noted that the invention described herein has been illustrated with reference to a particular embodiment. It is to be understood that many details used to facilitate the descriptions of such a particular embodiment are chosen for convenience only and without limitations on the scope of the invention. Many other embodiments may be devised by those skilled in the art without departing from the scope and spirit of the invention. Accordingly, the invention is intended to be limited only by the scope and spirit of the appended claims.

What is claimed is:

1. In a voltage converter including inverter means, pulsing means for driving said inverter means, and an output load coupled to said inverter means, a pulse width modulation control arrangement for providing fast current limit and balance functions comprising:
   a. sensing means for monitoring the instantaneous current flowing in said inverter means and for generating a first signal directly proportional to said instantaneous current;
   b. waveshaping means, exhibiting a nonlinear, monotonically increasing transfer characteristic, responsive to said first signal to produce a second signal related to said first signal by said characteristic;
   c. integrator means, connected to said waveshaping means and to said pulsing means, operative in response to said second signal to generate a feedback signal during each half cycle of operation of said inverter means, and operative in response to a reset signal from said pulsing means to reset said feedback signal to a predetermined reset level at the end of each half cycle of operation of said inverter means;
   d. level detection means responsive to said feedback signal and operative with respect to a predetermined reference level to generate a control signal whenever said feedback signal exceeds said predetermined reference level; and
   e. control means, responsive to said control signal, operative to terminate the flow of said instantaneous current for the remainder of the instant half cycle of operation of said inverter means thereby providing, within said instant half cycle of operation, inverter current balancing and limiting.

2. In a voltage converter as set forth in claim 1, wherein said output load includes rectifying means for generating a DC output voltage, and wherein said pulse width modulation control arrangement further comprises;
   differential amplifier means, connected to said output load, operative to generate an amplified output proportional to the difference between said DC output voltage and a DC reference, said amplified output corresponding to said predetermined reference level.

3. A pulse width modulation control arrangement as set forth in claim 1 wherein said sensing means comprises a current transformer having separate primary windings, each winding being serially connected with a corresponding inverter stage switching device for carrying the portion of said instantaneous current provided by said corresponding inverter stage switching device, and at least a single secondary winding, magnetically coupled to said primary windings, connected to provide said first signal to said waveshaping means.

4. A pulse width modulation control arrangement as set forth in claim 1 wherein said waveshaping means comprises;

rectifying means operative in response to said first signal to generate a proportionate signal related to the magnitude of said first signal, nonlinear energy source means, with output connected to the output of said waveshaping means, operative in response to said proportionate signal to generate said second signal, wherein said second signal exhibits low rate of change for all values of said proportionate signal less than a predetermined value, and wherein said second signal exhibits high rate of change for all values of said proportionate signal greater than said predetermined value.

5. A pulse width modulation control arrangement as set forth in claim 1 wherein said integrator means comprises;

capacitance means having a first terminal for receiving said second signal, and having a second terminal connected to said predetermined reset level, said capacitance means operative to charge to a potential corresponding to said feedback signal determined by the magnitude and duration of said second signal, and a switching device having a first output electrode connected to said first terminal, a second output electrode connected to said predetermined reset level, and a control electrode for receiving said reset signal, said switching device operative in response to said reset signal to discharge said capacitance means to said predetermined reset level.

6. A pulse width modulation control arrangement as set forth in claim 1 wherein said level detection means comprises, high gain amplifier means having a first input for receiving said feedback signal from said integrator means, a second input connected to said predetermined reference level, and an output corresponding to said control signal.

7. A pulse width modulation control method for providing fast current limit and balance functions in a voltage converter, said converter including inverter means for producing an alternating pulse current during each half cycle of operation, said method comprising the steps of:

a. generating a first signal directly proportional to said alternating pulse current;

b. generating a second signal exhibiting a nonlinear, monotonically increasing transfer characteristic with respect to said first signal;

c. integrating said second signal to produce a feedback signal;

d. comparing said feedback signal to a predetermined reference level;

e. generating a control signal whenever said feedback signal exceeds said predetermined reference level;

f. terminating, in response to the generation of said control signal, said alternating pulse current for the remainder of the instant half-cycle of operation of said inverter means; and g. resetting said feedback signal to a predetermined reset level in preparation for the next half cycle of operation of said inverter means.

* * * * *